(12) United States Patent
Brewin

(10) Patent No.: US 7,131,110 B2
(45) Date of Patent: Oct. 31, 2006

(54) METHOD AND APPARATUS FOR GENERATING A CODE BRIDGE

(75) Inventor: Robert F. Brewin, San Diego, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 688 days.

(21) Appl. No.: 10/103,407

(22) Filed: Mar. 21, 2002

(65) Prior Publication Data

US 2003/0182457 A1    Sep. 25, 2003

(51) Int. Cl.
G06F 9/44 (2006.01)

(52) U.S. Cl. ...................... 717/108; 717/114

(58) Field of Classification Search ........ 717/168–172, 717/108, 114; 709/223; 719/310, 313; 705/26, 705/10; 707/103
See application file for complete search history.

(56) References Cited

U.S. PATENT DOCUMENTS

| 5,848,273 | A * | 12/1998 | Fontana et al. ............. 717/108 |
| 6,199,195 | B1 * | 3/2001 | Goodwin et al. ........... 717/104 |
| 2002/0133392 | A1 * | 9/2002 | Angel et al. ................. 705/10 |
| 2002/0165786 | A1 * | 11/2002 | Matula et al. ................ 705/26 |
| 2003/0018694 | A1 * | 1/2003 | Chen et al. ................. 709/200 |
| 2003/0028549 | A1 * | 2/2003 | Hartel et al. ............ 707/103 R |
| 2003/0084134 | A1 * | 5/2003 | Pace et al. ................. 709/223 |
| 2003/0105883 | A1 * | 6/2003 | Gibbons ..................... 709/313 |
| 2004/0210445 | A1 * | 10/2004 | Veronese et al. .............. 705/1 |

OTHER PUBLICATIONS

X. Liu, "Bridge Between Java and Windows," http://www.codeproject.com/threads/bridgewinjava.asp; Article content copyright Xiangyang Liu, 2001; 5 pages.
Apple Computer, Inc., 1998; "Using the Java Bridge," http://developer.apple.com/techpubs/macosx/Cocoa/Legacy/JavaBridge/JavaBridge.pdf; 20 pages.

* cited by examiner

Primary Examiner—Tuan Dam
Assistant Examiner—Isaac T. Tecklu
(74) Attorney, Agent, or Firm—Osha Liang LLP

(57) ABSTRACT

A method for generating a code bridge between a client application and a target application, including generating a metadata file defining exposed interfaces for the client application and the target application, creating a schema defining the code bridge using the metadata file, and generating source code for the code bridge using the schema.

29 Claims, 7 Drawing Sheets

METHOD AND APPARATUS FOR GENERATING A CODE BRIDGE

BACKGROUND OF INVENTION

Organizations typically have multiple platform dependent and language (e.g., Java™, C++, .Net, etc.) dependent solutions to support various portions of their business and operation. For example, an organization may use Java™ to create a web-based solution to support the organization's e-commerce operation, and may purchase a .Net solution to support customer relationship management (CRM). If the organization wishes to integrate the two solutions, a "bridge" is required. The bridge, in this particular example, allows the .Net based CRM solution to interact with the Java™ based web-solution and vice versa.

There are three main categories of bridges: local, remote, and distributed. A local bridge is one, which will result in bridging two bodies of code existing in the same process (e.g., within the same application). A remote bridge is one, which will result in bridging two bodies of code existing in multiple processes (e.g., different application spaces). In the local bridge and the remote bridge solutions, portions of the bridge components will exist in both the bodies of code being bridged. In contrast, each component in a distributed bridge resides in a separate process, i.e., two bodies of code each exist in a separate process, and the bridge also resides in a separate process.

An example of a bridge technology that is currently available is the Java™ Native Interface (JNI). JNI is a model for bridging code based on the 'C' language standard. In the following descriptions of bridge architectures, the client code is that body of code attempting access to existing code, the target code is that pre-existing body of code which exists as an application or library. The following describes the typical steps involved in implementing a JNI-based solution for bridging a Java™-based application with Native 'C' code. First, the Java™-based application is created exposing native methods, i.e., methods implemented in 'C'. This is done by qualifying a method with the "native" keyword. The Java™-based application is compiled typically using "javac". The "javah" command with the -jni flag is then used to generate a 'C'-style header file containing method declarations for each method declared as "native." Using the generated 'C'-style header file, an implementation file is created containing an implementation function for each declared method in the 'C'-style header file. The implementation file is then compiled creating a native dynamic library. Additional Java™ code is then added to the Java™-based application to load the new dynamic library prior to the use of the native methods. The Java™-application is then re-compiled to produce the Java™-based application. Prior to running the Java™-based application, any changes to the environment to allow the dynamic library to be locatable and loadable are also performed. Once this is complete, the Java™-based application may be run. If the native code was re-written in C++, the above mentioned steps would have to be repeated to create a new bridge.

SUMMARY OF INVENTION

In general, in one aspect, the invention relates to a method for generating a code bridge between a client application and a target application, comprising generating a metadata file defining exposed interfaces for the client application and the target application, creating a schema defining the code bridge using the metadata file, and generating source code for the code bridge using the schema.

In general, in one aspect the invention relates to a method for generating a code bridge between a client application and a target application, comprising generating a metadata file defining exposed interfaces for the client application and the target application, creating a schema defining the code bridge using the metadata file, generating source code for the code bridge using the schema, and deploying the code bridge using a binary component derived from the source code.

In general, in one aspect, the invention relates to a method for generating a reusable code bridge component, comprising generating a first schema defining an exposed interface for a target application, generating a second schema defining an exposed interface for a first client application, generating a target-side code bridge component using the first schema and the second schema, generating a first client-side code bridge component using the first schema and the second schema, and bridging the target application and first client application using the first client-side code bridge component and the target-side code bridge component.

In general, in one aspect, the invention relates to a computer system having a client application and a target application comprising a client component interfacing with the client application, a target-component interfacing with the target application, and a plurality of converting components functionality interposed between the client component interface and the target component interface and configured to convert a client application method call into a target application method call, wherein the plurality of converting components are distributed across the computer system.

In general, in one aspect, the invention relates to a code bridge for a computer system having a client application and a target application comprising a client component interfacing the client-side bridge component with the client application, a client accessor delegating method calls and property operations to the target-side bridge component, an NcObject providing a handle to an NcContainer on the target-side bridge component, a target container providing an implementation of method calls and property invocations for the target-side bridge component, an NcContainer providing a parameterized instance of a container for an object used implemented by the target container, a typedata object providing a cache of type information required by the target container for implementation of methods calls and property invocations, and an object container providing utility methods used to automatically de-reference or map user-object specific semantics for the NcContainer.

In general, in one aspect, the invention relates to an apparatus for generating a code bridge between a client application and a target application, comprising means for generating a metadata file defining exposed interfaces for the client application and the target application, means for creating a schema defining the code bridge using the metadata file, and means for generating source code for the code bridge using the schema.

In general, in one aspect, the invention relates to an apparatus for generating a code bridge between a client application and a target application, comprising means for generating a metadata file defining exposed interfaces for the client application and the target application, means for creating a schema defining the code bridge using the metadata file, means for generating source code for the code bridge using the schema; and means for deploying the code bridge using a binary component derived from the source code.

In general, in one aspect, the invention relates to an apparatus for generating a reusable code bridge component, comprising generating a first schema defining an exposed interface for a target application, generating a second schema defining an exposed interface for a first client application, generating a target-side code bridge component using the first schema and the second schema, generating a first client-side code bridge component using the first schema and the second schema, bridging the target application and first client application using the first client-side code bridge component and the target-side code bridge component, generating a third schema defining an exposed interface for a second client application, generating a second client-side code bridge component using the first schema and the third schema, and bridging the target application and the second client application using the second client-side code bridge component and the target-side code bridge component.

Other aspects and advantages of the invention will be apparent from the following description and the appended claims.

DETAILED DESCRIPTION

Figure 1:
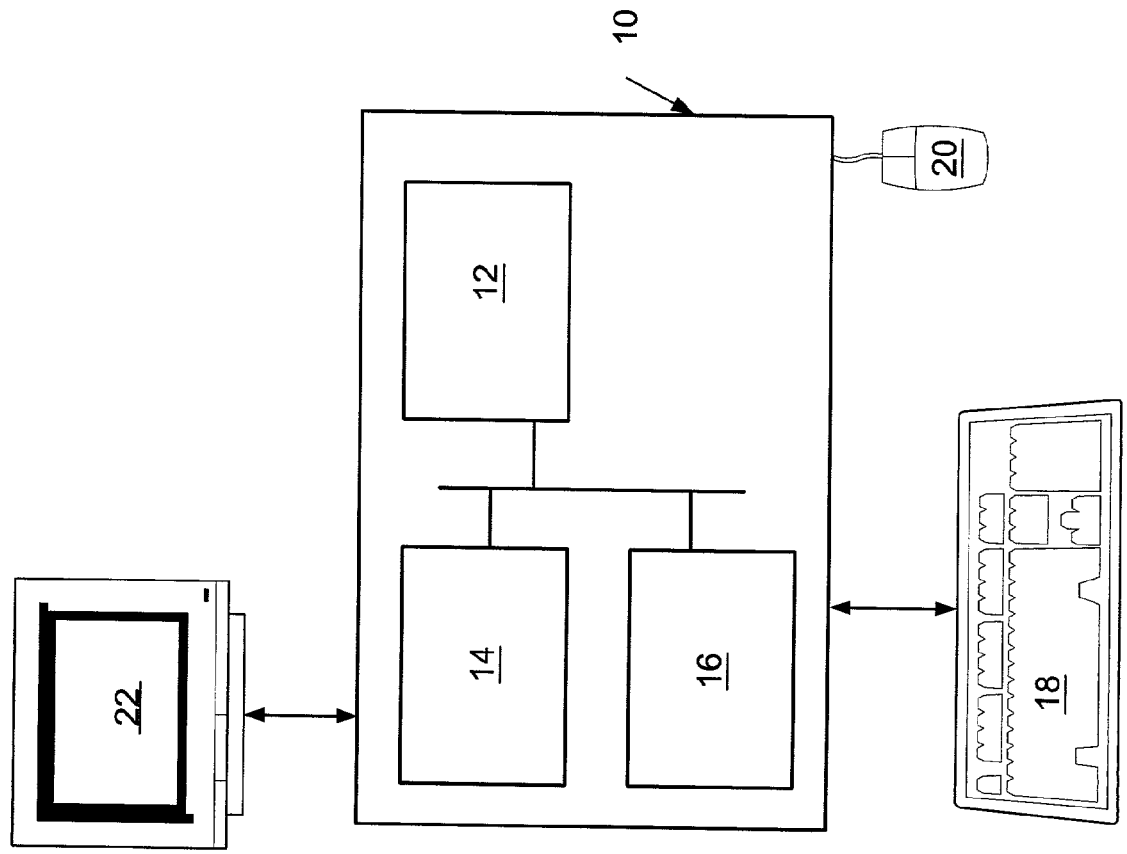
FIG. 1 illustrates a typical computer.

Exemplary embodiments of the invention will be described with reference to the accompanying drawings. Like items in the drawings are shown with the same reference numbers.

In the following detailed description of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

The invention relates to a method for the automatic generation of a code bridge between differing languages and platforms. Further, the invention relates to using metadata that defines exposed interfaces to derive a schema, which is subsequently used to generate the code bridge. Further, the invention relates to generating a code bridge with a client bridge component and a target bridge component that are independently reusable.

The present invention may be implemented on virtually any type computer regardless of the platform being used. For example, as shown in FIG. 1, a typical computer (10) includes a processor (12), associated memory (14), a storage device (16), and numerous other elements and functionalities typical of today's computers (not shown). The computer (10) may also include input means, such as a keyboard (18) and a mouse (20), and output means, such as a monitor (22). Those skilled in the art will appreciate that these input and output means may take other forms in an accessible environment.

In the following detailed description of bridge architectures, the client code is that body of code attempting access to existing code, the target code is that pre-existing body of code which exists as an application or library.

Figure 2:
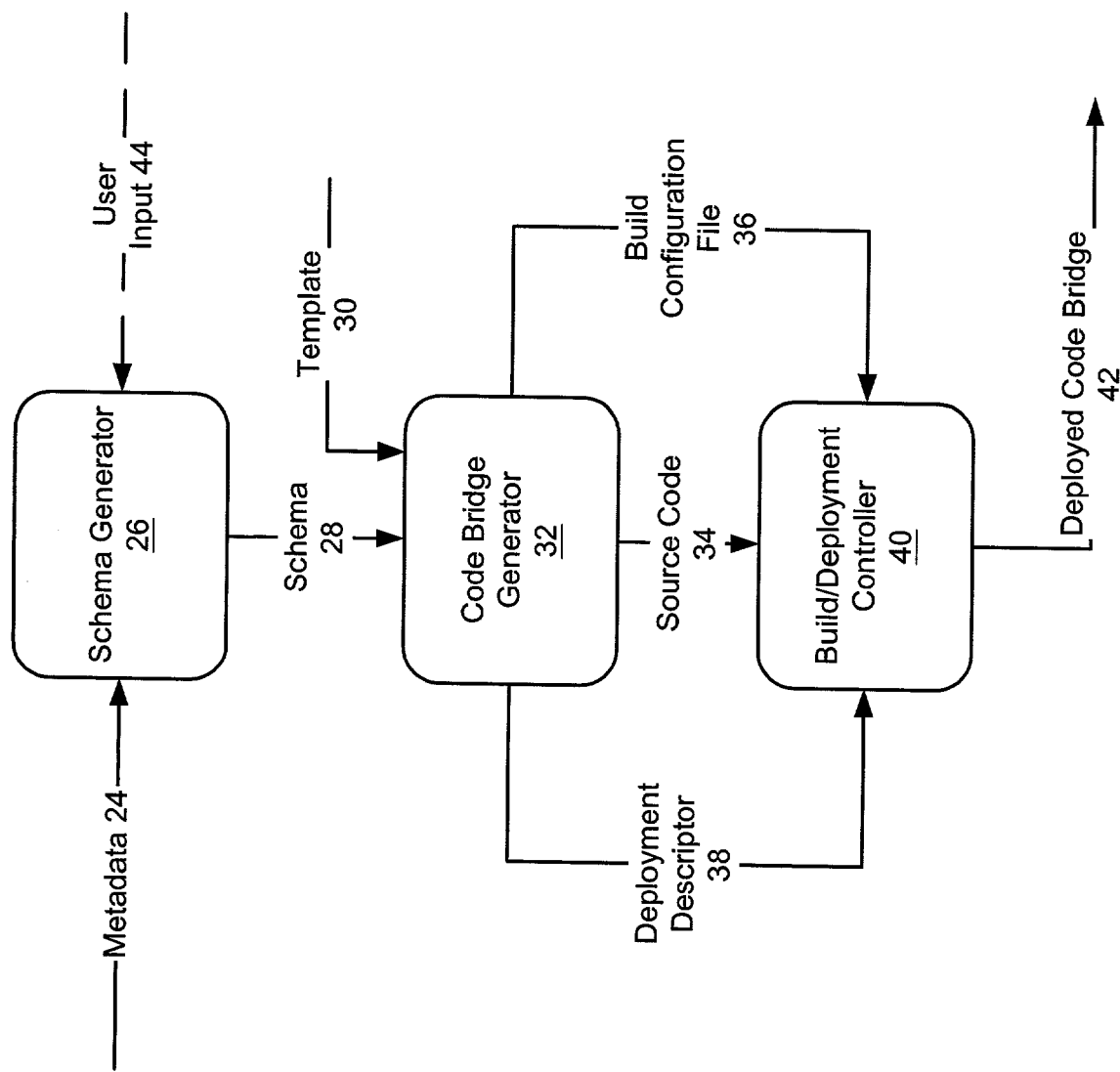
FIG. 2 illustrates a flow diagram describing a process for generating a code bridge in accordance with one embodiment of the invention.

FIG. 2 illustrates a flow diagram describing a process for generating a code bridge in accordance with one embodiment of the invention. Metadata (24) is input into a Schema Generator (26) to produce a Schema (28). The schema (28) and required templates (30) are input into a Code Bridge Generator (32) to produce three output files: source code (34), a build configuration file (36), and a deployment descriptor file (38). The three aforementioned files are then used as input for a Build/Deployment Controller (40) that produces a deployed code bridge (42).

The metadata (24) defines interfaces exposed by a client application and by a target application. The interfaces refer to places in the application that may be accessed by another application. For example, in Java™, the keyword "public" is used to denote a class that is accessible by another external element (e.g., a class, a method, an application, etc.). In one embodiment of the invention, the metadata (24) is manually generated by a programmer. In another embodiment of the invention, the metadata (24) is obtained from a compiler. During compilation of the source code for the client application and the target application, the compiler can emit metadata (24) that defines the exposed interfaces. In another embodiment of the invention, an introspection tool is used to generate metadata (24). In certain languages, e.g., Java™, Visual Basic, etc., metadata (24) is encoded into the generated binaries in the form of byte code or encoded metadata (e.g., .Net Microsoft® Intermediate Language). This metadata (24) may be subsequently extracted by the introspection tool. The introspection tool then proceeds to examine the binary metadata and produce the required metadata (24). In another embodiment of the invention, a code descriptor database is used to generate the metadata (24).

The metadata (24), generated using one or more of the above embodiments, is subsequently input into the schema generator (26). The schema generator (26) automates the process of component design and specification to produce a schema (28) that is used to generate the code bridge. In one embodiment of the invention, the schema generator contains functionality to automatically generate the schema (28) from the metadata (24) by using a component design-editor. In another embodiment of the invention, the schema (28) is generated using an automation tool. In other embodiment of the invention, the schema generator (26) applies established defaults for naming conventions, parameter usage and conflict resolution to produce the schema (28). Elements that cannot be handled appropriately by the established defaults are flagged. The schema generator (26) then requests user input (44) to resolve conflicts and correct naming issues for each of the flagged elements. In another embodiment of the invention, the schema generator (26) includes functionality to allow the user to fine-tune the schema (28). In one embodiment of the invention, the schema (28) is defined using Extensible Mark-up Language (XML).

The schema (28) generated using one or more of the aforementioned embodiments is input into the Code Bridge Generator (32) along with the necessary templates (30) to produce the source code (34), the build configuration file (36), and the deployment descriptors (38). The code bridge generator (32) generates a code bridge to map the interfaces exposed by the target application to interfaces exposed by the client application and vice versa. The templates (30) define how the schema (28) is to be used to generate the source code (34). In one embodiment of the invention, the templates are defined using Extensible Stylesheet Language (XSL), the schema is defined using XML, and the code bridge generator (32) is an XSL transformation processor. In one embodiment of the invention, the source code is generated in two distinct groups: client side source code and target side source code. The client side source code and the target side source code are each written in the native language of the client application and target application/object, respectively.

The deployment descriptor (38) describes configuration information for the code bridge. In one embodiment of the invention, the deployment descriptor (38) is an XML document. Further, the deployment descriptor may provide a resource for maintaining a persistent model of the mapped interfaces. The build configuration file (36) describes the "rules" that determine how the source code (34) is to be built on a specific platform.

Those skilled in the art will appreciate that the deployment descriptors (38) and the build configuration file (36) are platform (i.e., operating system) specific and architecture (i.e., 2-tier system, 3-tier system, etc.) specific, while the generated source code (34) is platform independent.

The source code (34), the build configuration file (36), and the deployment descriptor (38) are subsequently input into the Build/Deployment Controller (40) to produce the deployed code bridge (42). The Build/Deployment Controller includes functionality to generate the necessary components to produce the deployed code bridge (42) using the aforementioned inputs.

Figure 3:
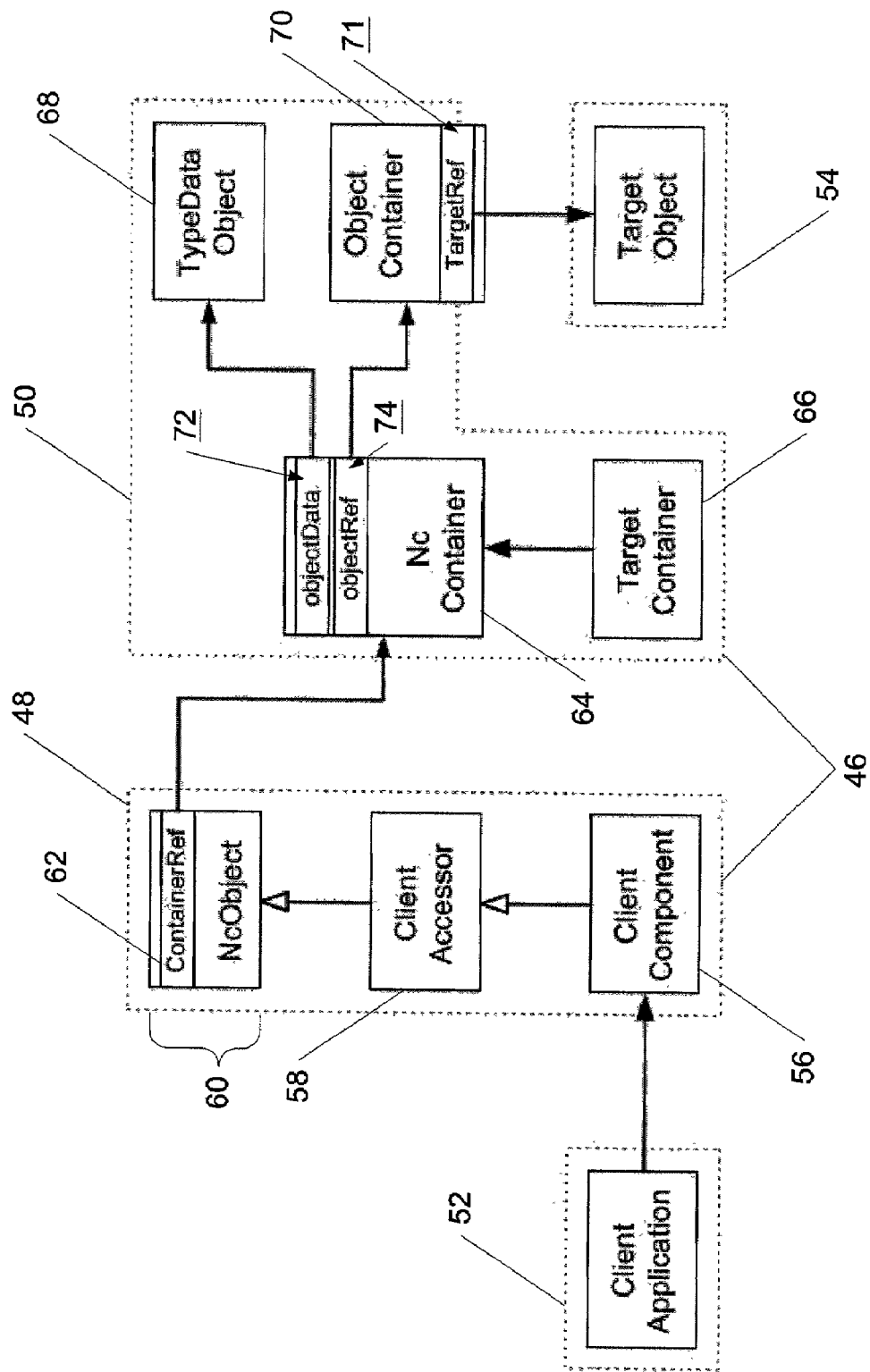
FIG. 3 illustrates an architecture for a code bridge in accordance with one embodiment of the invention.

FIG. 3 illustrates an architecture for a code bridge in accordance with one embodiment of the invention. The code bridge (46) is used to bridge, in this particular embodiment, a client application (52), and a target object (54). The target object (54) refers to the object(s) residing in the user library. The code bridge (46) is divided into two distinct parts: a client bridge component (48);, and a target bridge component (50). The division of code bridge (46) into two components allows each component to be implemented in a different language and a different platform,. Further, the division of the code bridge (46) into two components allows the components to be distributed across multiple platforms. Further, the division of the code bridge (46) into two components allows each corresponding aspect of the code bridge (46) to vary independently, allowing client and/or target components multiple interfaces to differing client or target applications.

The client bridge component (48); includes three distinct components: a client component (56), a client accessor (58), and an NcObject (60). The client component (56) is the class or object that the client application (52) interacts with. The client component (56) is natural within the client environment, i.e., the client component (56) is generated in the client implementation language and does not export any interfaces which expose the underlying semantics, platform or language of the code bridge (46) or target object (54). All methods and property actions that are propagated over the bridge are delegated by the client component (56) to the client accessor (58).

The client accessor (58) is the primary functional component that interacts with the code bridge (46). The implementation of the client accessor (58) may differ depending on the bridge type (i.e., local, remote, distributed, etc.), but the semantics remain functionally identical, that is, the client component (56) delegates method calls and property get/set operations to the client accessor (58). The client accessor (58) in turn is required to delegate such calls through the code bridge (46) to the target bridge component (50) via the NcObject (60).

The NcObject (60) provides three distinct functions: (i) the NcObject (60) provides a common base for any polymorphic implementation which may be required of the client bridge component (48); (ii) the NcObject (60) provides an object to encapsulate any object-specific data which may be required to manage the code bridge (46) and any contained objects, in particular, the NcObject (60) includes a reference (62) to an NcContainer (64) located in the target bridge component (50); (iii) the NcObject (60) provides an anchor for communication between the instances of the code bridge runtime, which manages each pair of client application (52) and target object (54). The code bridge runtime is described below.

The target bridge component (50) includes four components: a target container (66), an NcContainer (64), a TypeData Object (68), and an Object Container (70). The target container (66) provides the implementation of method calls and property invocations for the target-side (50). The management of target object (54) is delegated to the NcContainer (64).

The NcContainer (64) is a parameterized instance of the target object (54) being bridged. This container encapsulates the target object (54) as well as any type data required to manage contained objects, provide caching for any static data, or provide implementation-defined code to enable optimized invocations of objects on the client-side of the bridge. Further, the NcContainer (64) contains an objectData reference (72), referencing the TypeData Object (68), and an objectRef reference (74), referencing the Object Container (70).

The TypeData Object (68) is a cache of type information, which may be, required of code in the target container (66), which is used on method invocations, or object management code. An example of this is a Java™ method or class ID data that can be cached to optimize calls when using JNI.

The Object Container (70) contains the managed/bound target object (54). Further, the Object Container (70) is a parameterized or polymorphic type included to facilitate the potentially different types of target objects (54) (for example, an object versus a pointer-to-object). The Object Container (70) generally provides utility methods used to automatically de-reference or otherwise map target object (54) specific semantics as needed to allow for a consistent set of bridge interfaces. Additionally, the Object Container (70) includes a TargetRef reference (73) that references the target object (54).

The following description details a method invocation using the code bridge architecture illustrated in FIG. 3. Initially, the client application (52) invokes a client component method in the client component (56), passing all necessary arguments that are required for that method to the client component (56). The client component (56) in turn invokes a client component accessor method in client accessor (58), passing all arguments initially received from the client application (52) to the client accessor (58).

The client component accessor method in turn invokes an accessor function that performs the steps that are required to invoke a target method on the target container (66). These steps may include, but are not limited to, marshalling of parameters, binding to transport sockets, or other steps needed to pass messages or perform a procedure call to the target object (54). An example of a simple accessor function call would be that of a native call in Java™ for use in binding using JNI. Part of that call will involve retrieving the ContainerRef reference (62) from the NcObject (60) for the invocation of the target method on the target container (66). The accessor function invokes the target method via whatever protocol is required by the code bridge (46), passing the ContainerRef (62) and all arguments required by the target method. The target container (66) uses the ContainerRef (62) to retrieve the objectRef (74). The objectRef (74) provides a reference to the ObjectContainer (70) which holds the reference (i.e., TargetRef (71)) to the actual target object (54) being bridged.

The target method, running on the target container (66), subsequently invokes the actual method in the target object, optionally using the objectRef (74) as part of the call. For example, in 'C++', this would normally be a pointer for an object. In the case of a 'C' call, no such parameter is needed, although if the invocation was against a property in an object (e.g., a data member), the object reference would be used to bind to the actual data member of the target object which the reference points to.

Figure 4:
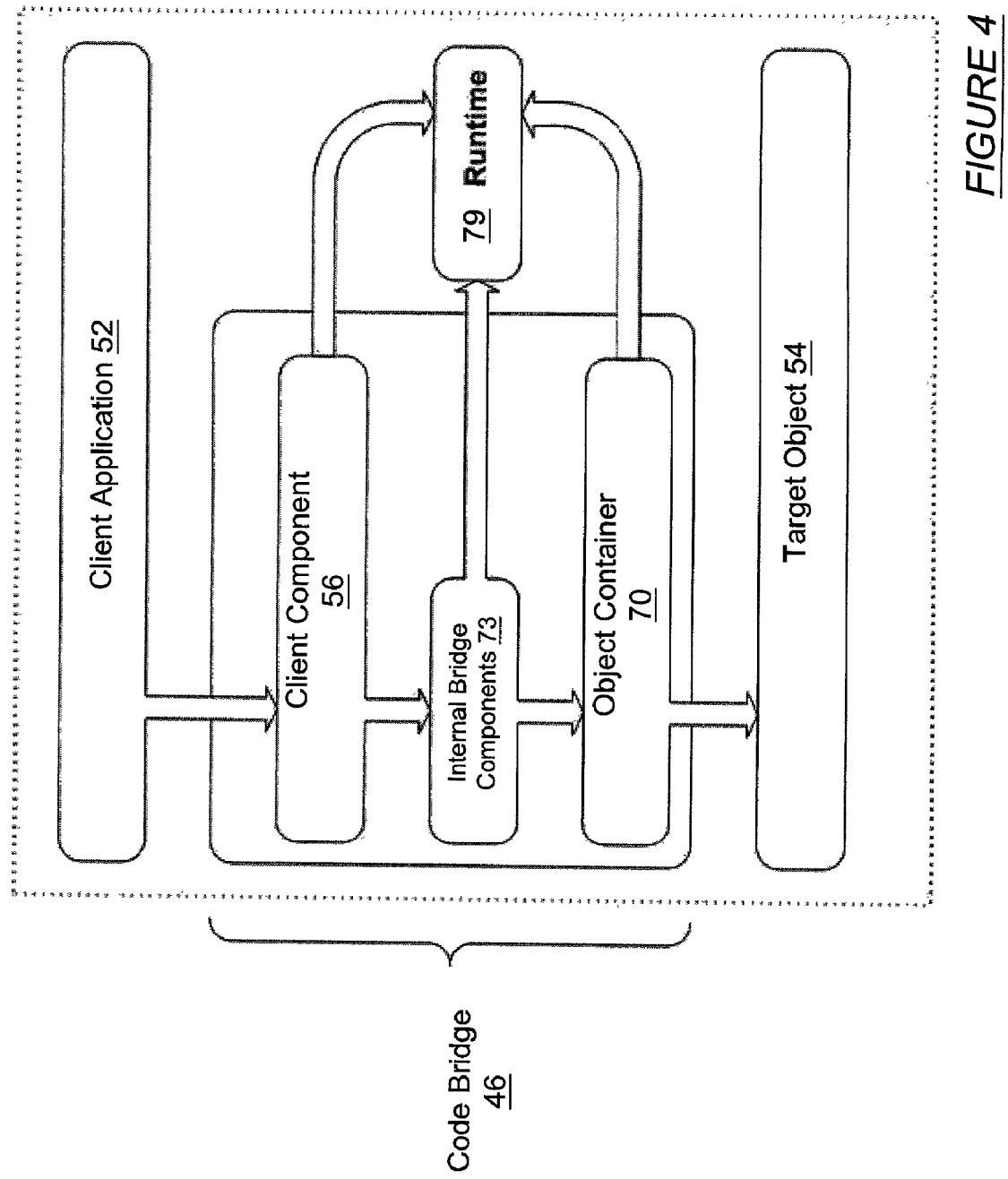
FIG. 4 illustrates a runtime architecture for a code bridge in accordance with one embodiment of the invention.

FIG. 4 illustrates the runtime architecture of the code bridge (46) in accordance with one embodiment of the invention. The runtime architecture includes a client application (52), the code bridge (46), the runtime (79), and the target object (54). The code bridge is further broken down into the client component (56), the object container (70), and internal bridge components (73) that includes all components of the code bridge (46) shown in FIG. 3 with the exception of the client component (56) and the object container (70). The runtime (79) handles any system behavior required, such as object lifetime management, exception handling, etc. Further, a call may be made to the runtime (79) from any component within the code bridge (46) to handle requirements imposed upon the requesting component within the code bridge (46) by the host environment or language.

Further, in one embodiment of the invention, the runtime (79) is distributed across the code bridge (46). This allows the management of the objects being bridged to be confined to the side of the bridge they are bound to. Further, the distribution provides for a more elegant and less error-prone implementation, as semantics of specific implementation details required by either the client bridge component (48 in FIG. 3) or the target bridge component (50 in FIG. 3) are best understood and handled within the domain of the client application (52) or target object (54), respectively. Further, by separating the runtime across the code bridge (46), the client bridge component (48); and the target bridge component (50) become interchangeable. Thus a given runtime, e.g., the runtime on the client bridge component (48), may be used with a wide variety of potential targets.

The following example illustrates a code bridge used to bridge existing C++ code to a new Java™ class usable from within a Java™ application. The following code sample details the existing C++ code in accordance with the principles of the invention.

Code Sample 1: Existing C++ Code

```
class HelloWorld {
public:
    HelloWorld( );
    const char* value( );
```

Code Sample 1: Existing C++ Code -continued

```
};
HelloWorld: :HelloWorld( )
{
}
const char* HelloWorld: :value( )
{
    return "Hello World!";
}
HelloWorld hw;
```

The code shown in Code Sample 1 includes two interfaces to be bridged, a 'value' method that returns a constant string, and a global variable 'hw' that may be accessed via the code bridge.

Figure 5:
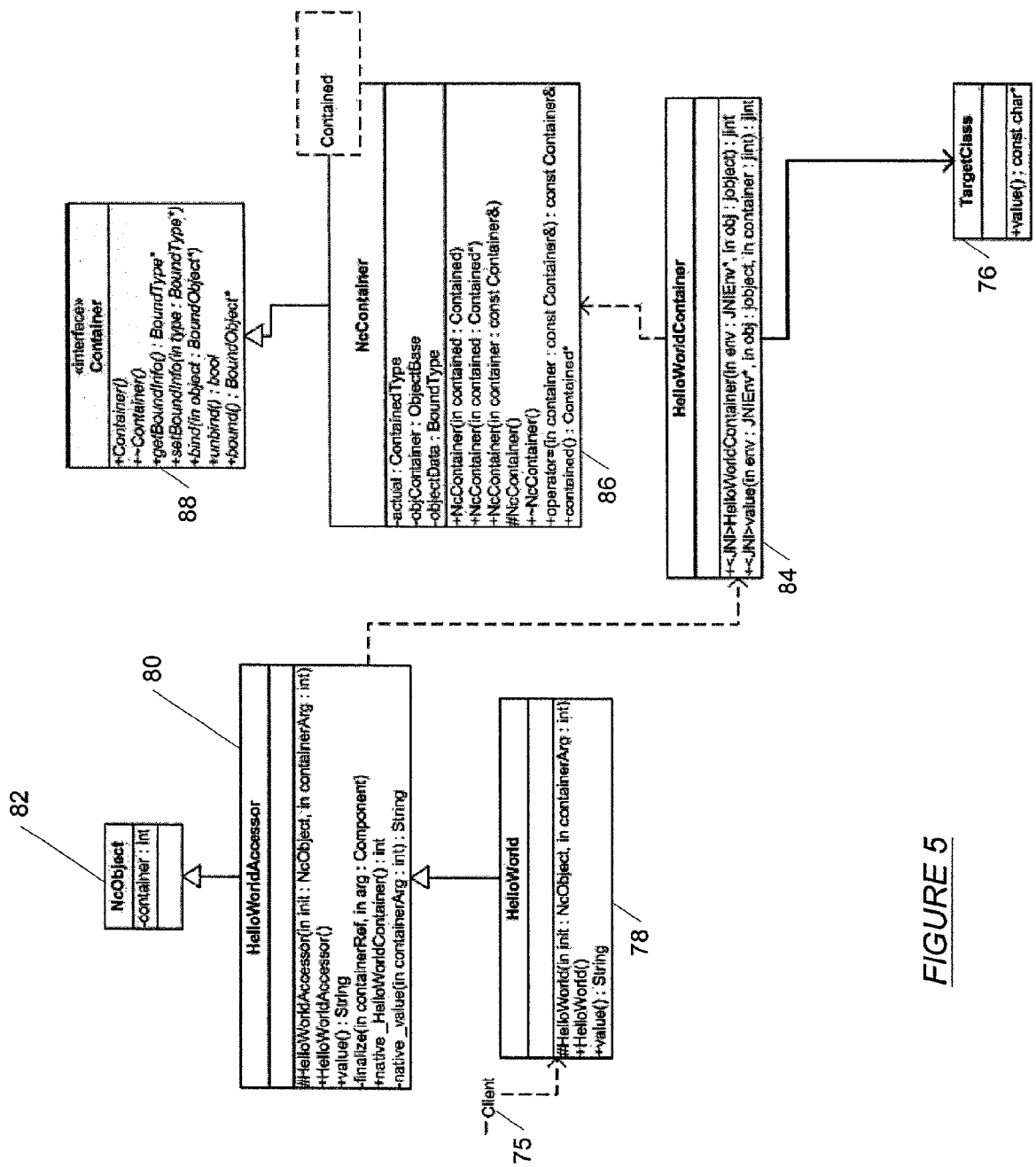
FIG. 5 illustrates a model of a code bridge using the bridge Java and C++.

FIG. 5 illustrates a model of a code bridge using the bridge Java and C++ in accordance with the above example. An NcObject (82) acts as a superclass for the HelloWorldAccessor (80). The HelloWorldAccessor (80) in turn has a sub-class HelloWorld (78). The HelloWorld (78) sub-class is referenced by the client (75), which in this example is the Java™ application. The NcObject (82) provides storage (and potentially manipulation functions) for maintaining a reference to a HelloWorldContainer (84) that exists on the target side of the code bridge. In this example, the reference is a data element suitable for storing the reference to the HelloWorldContainer (84). As Java™ does not support pointers, the reference to the HelloWorldContainer (84) is typecast to an integer type. For a more complex code bridge, the NcObject (82) would define a true reference (for example, in Windows®, this could be a Global Unique Identifier (GUID) for a COM object) with appropriate methods to extract a usable data element that can be used by a target class to locate the correct container. Further, the HelloWorldContainer (84) is bound to the TargetClass (76).

The target side of the bridge depends largely on an NcContainer (86) and a Container interface (88). The container interface (88) defines no members, but simply declares the interfaces that all NcContainer objects must implement as well as provides polymorphic behavior for the runtime. The NcContainer (86) defines various methods to bind and unbind the HelloWorldContainer (84) to HelloWorldAccessor (80) based components. As a result of invoking these methods, classes implementing an NcContainer (86) are required to do whatever bookkeeping is required to maintain a linkage between the two sides of the bridge as well as register them with the runtime. As a result of a bind or unbind operation, an NcContainer (86) implementation may implement additional initialization and finalization steps which are required for contained target objects.

Specifically in this example, the NcContainer (86) provides a specific implementation designed for Java to C++ code bridge. The implementation includes functionality for initialization and finalization of contained objects via the constructors and destructors. Further, the implementation includes functionality for reference counting contained objects as well as the NcContainer (86) itself. Further, the implementation includes functionality to allow the NcContainer (86) to track the bound objects and their types, as well as, the actual object that the NcContainer (86) uses to invoke methods against.

Figure 6:
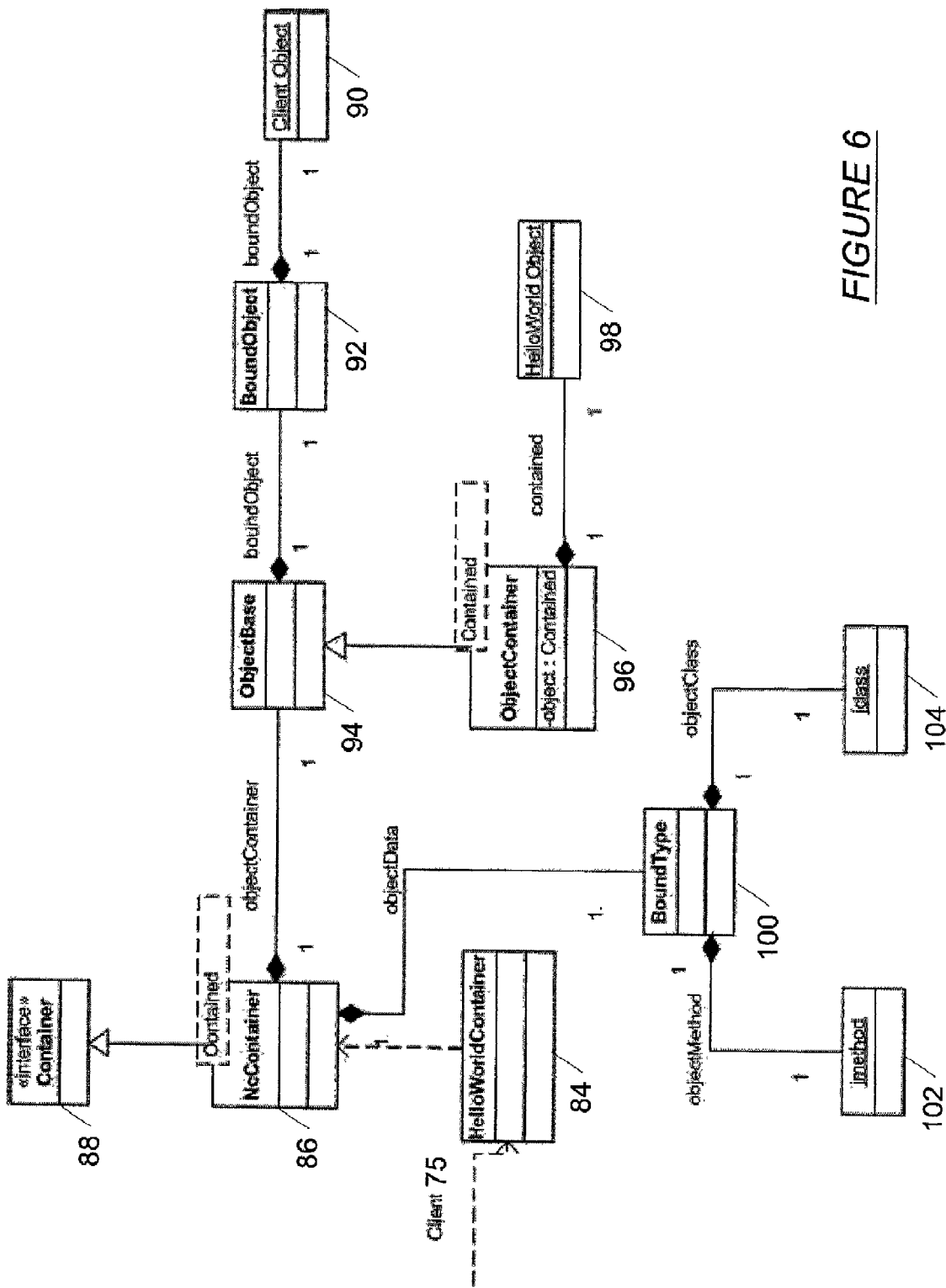
FIG. 6 illustrates a model of a runtime architecture for the code bridge modeled in FIG. 5.

FIG. 6 illustrates a model of a runtime architecture for the code bridge modeled in FIG. 5. The Client (75) references the HelloWorldContainer (84). The HelloWorldContainer (84) in turn includes a reference to the NcContainer (86).

The NcContainer (86) is a sub-class of the Container interface (88) and has a parameterized type of the contained object. In this particular example, the contained object is the Client Object (90). The Client Object (90) is owned by a Bound Object (92). The Bound Object (92) is a cached element that holds a reference to the Client Object (90). The Bound Object (92) in turn is owned by an ObjectBase (94) that is owned by the NcContainer (86). The ObjectBase (94) is a superclass of an Object Container (96). The Object Container (96) serves as the actual reference counted object that encapsulates the target object, in this case the HelloWorld object (98), being bound to the NcContainer (86). The NcContainer (86) also owns a BoundType (100). The BoundType (100) serves as a cache for static class and method information for the bound client class, in this case, the bound client class would be a Java™ class type in the Client Object (90). In particular, the BoundType (100) owns a method object (102) for storing Java™ methods, and a class object (104) for storing Java™ classes.

Figure 7:
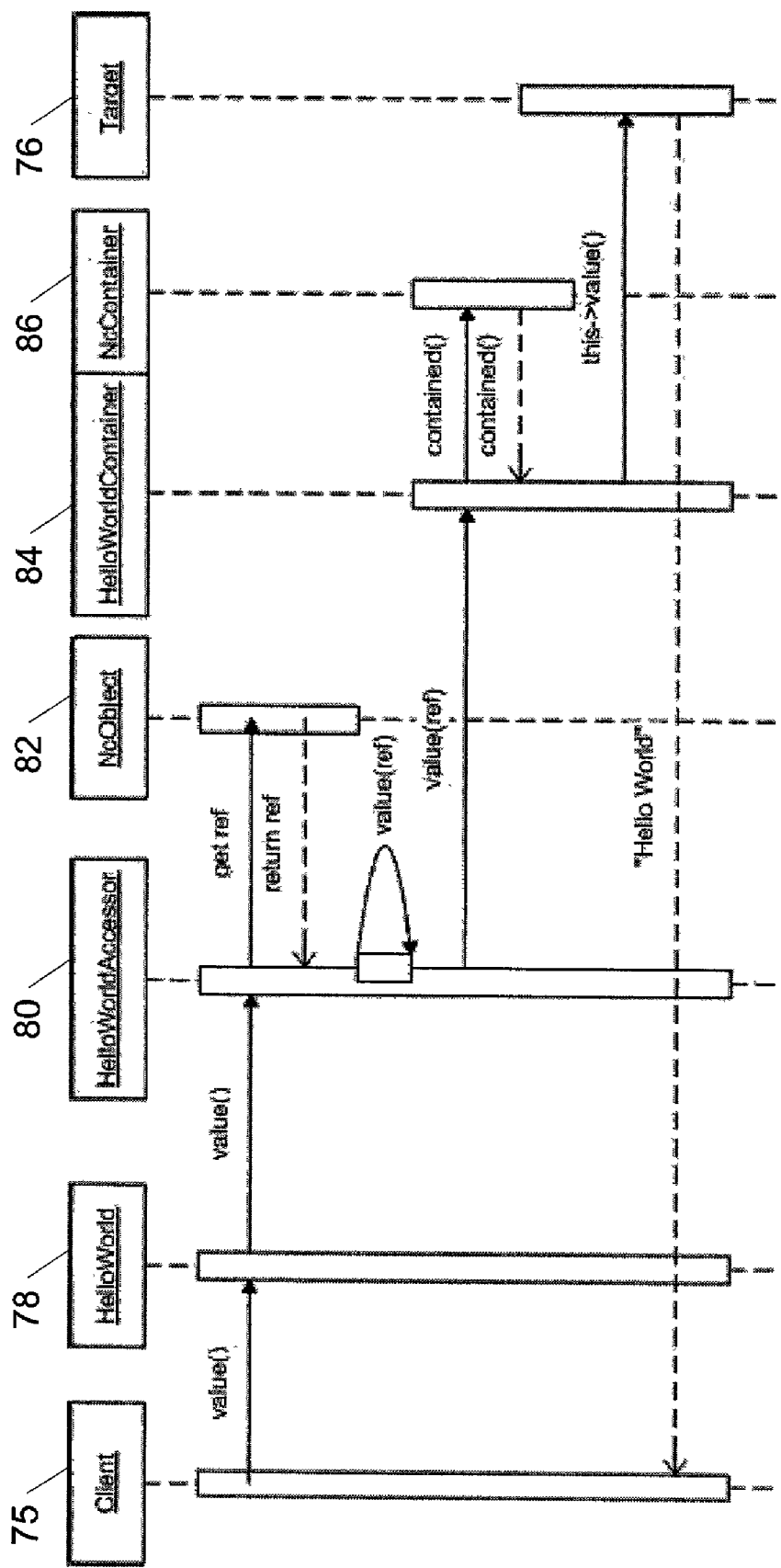
FIG. 7 illustrates a sequence diagram for detailing the method invocation using the code bridge illustrated in FIG. 5.

FIG. 7 illustrates a sequence diagram for detailing the method invocation using the code bridge illustrated in FIG. 5. A Client (75) calls the value method in the HelloWorld class, located in the HelloWorld object (78), to retrieve a string from the Target (76). Note that "Target" as denoted in FIG. 7 is the same as "Target Class" illustrated in FIG. 5, for the purposes of this example. The HelloWorld object (78) in turn invokes a superclass method value in its superclass, the HelloWorldAccessor (80). The HelloWorldAccessor (80) method value (a standard Java™ method) retrieves the HelloWorldContainer (84) reference (noted as ref in FIG. 7) and invokes a native value method which in turn invokes a method defined in the class HelloWorldContainer (84). The HelloWorldContainer (84) class retrieves the actual reference to the target (76) from the NcContainer (88). The HelloWorldContainer (84) class then uses the returned reference, in this case, a pointer (noted as this in FIG. 7) as a call to the actual value method in the instance of the HelloWorld object (78) residing on the Target (76). The resulting string is returned to the Client (75). The HelloWorldContainer (84) implementation takes the appropriate steps to convert the resulting const char* string to a Java™ String class.

The invention has one or more of the following advantages. The invention provides an automatic means for generating a code bridge resulting in a decrease in development time to bridge two pieces of code, increase flexibility to use a wide variety of legacy applications without requiring specific legacy application expertise, and decreases coding errors due to minimal user interaction.

Further, by encapsulating the target object within a delegating container, the target object itself does not need to change as a result of being bridged. Further, the target object does not need to be re-compiled prior to being bridged, provided the metadata needed for code generation is available.

The lifetime of the target object is managed within the domain of the target itself, rather than by the client. Given that the target container (and runtime components) are implemented in the native environment of the target object, they can interact directly with the object as well as any manage any runtime interactions which may be required. This allows the runtime to manage object lifetime, exceptions, and other significant events without requiring a extra code.

The client and target components of the bridge are largely independent, the only direct interaction being either through the interfaces used to invoke methods in the target container (which are known and managed by the system) or the runtime, which are also known and managed by the code bridge. As a result, different clients can attach to a single implementation of a generated target bridge component without requiring regeneration or recompilation of the target components.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for generating a code bridge between a client application and a target application, comprising:
   generating a metadata file defining exposed interfaces for the client application and the target application;
   creating a schema defining the code bridge using the metadata file; and
   generating source code for the code bridge using the schema,
   wherein the code bridge enables the client application to invoke a method on the target application, and
   wherein the client application is written in a first programming language and the target application is written in a second programming language.

2. The method of claim 1, further comprising:
   deploying the code bridge using a binary component derived from the source code.

3. The method of claim 1, wherein generating the metadata file comprises using a compiler.

4. The method of claim 1, wherein generating the metadata file comprises using an introspection tool.

5. The method of claim 1, wherein generating the metadata file comprises using a code descriptor database.

6. The method of claim 1, wherein the schema uses Extensible Mark-up Language to define the code bridge.

7. The method of claim 1, wherein creating the schema comprises using a metadata conversion tool.

8. The method of claim 1, wherein creating the schema comprises using a component-design editor.

9. The method of claim 1, wherein creating the schema comprises using an automation tool.

10. The method of claim 9, wherein the automation tool comprises functionality for parameter usage and parameter conflict resolution.

11. The method of claim 9, wherein the automation tool comprises functionality to automatically generate the schema using default rules.

12. The method of claim 9, wherein the automation tool comprises functionality to flag a portion of the metadata that the automation tool cannot process.

13. The method of claim 9, wherein the automation tool comprises functionality to review and refine an automatically generated schema file.

14. The method of claim 1, wherein generating source code for the code bridge uses an extensible stylesheet language template and an extensible stylesheet language processor.

15. The method of claim 1, further comprising: generating a descriptor for the code bridge using the schema.

16. The method of claim 2, further comprising:
   generating a descriptor containing configuration information for the code bridge using the schema; and
   generating a build configuration file containing rules for the code bridge using the schema.

17. The method of claim 16, wherein the binary component is generated using the source code, the descriptor, and the build configuration file.

18. A method for generating a code bridge between a client application and a target application, comprising:
generating a metadata file defining exposed interfaces for the client application and the target application;
creating a schema defining the code bridge using the metadata file;
generating source code for the code bridge using the schema; and
deploying the code bridge using a binary component derived from the source code,
wherein the code bridge enables the client application to invoke a method on the target application, and
wherein the client application is written in a first programming language and the target application is written in a second programming language.

19. A method for generating a reusable code bridge component, comprising:
generating a first schema defining an exposed interface for a target application;
generating a second schema defining an exposed interface for a first client application;
generating a target-side code bridge component using the first schema and the second schema;
generating a first client-side code bridge component using the first schema and the second schema; and
bridging the target application and first client application using the first client-side code bridge component and the target-side code bridge component.

20. The method of claim 19, further comprising:
generating a third schema defining an exposed interface for a second client application;
generating a second client-side code bridge component using the first schema and the third schema; and
bridging the target application and the second client application using the second client-side code bridge component and the target-side code bridge component.

21. The method of claim 19, wherein the first schema comprises Extensible Mark-up Language.

22. The method of claim 19, wherein the second schema comprises Extensible Mark-up Language.

23. The method of claim 20, wherein the third schema comprises Extensible Mark-up Language.

24. The method of claim 19, wherein generating the first client-side code bridge component comprises an extensible stylesheet language template and an extensible stylesheet language processor.

25. The method of claim 19, wherein generating the target-side code bridge component comprises an extensible stylesheet language template and an extensible stylesheet language processor.

26. The method of claim 20, wherein generating the second client-side code bridge component comprises an extensible stylesheet language template and an extensible stylesheet language processor.

27. An apparatus for generating a code bridge between a client application and a target application, comprising:
means for generating a metadata file defining exposed interfaces for the client application and the target application;
means for creating a schema defining the code bridge using the metadata file; and
means for generating source code for the code bridge using the schema,
wherein the code bridge enables the client application to invoke a method on the target application, and
wherein the client application is written in a first programming language and the target application is written in a second programming language.

28. An apparatus for generating a code bridge between a client application and a target application, comprising:
means for generating a metadata file defining exposed interfaces for the client application and the target application;
means for creating a schema defining the code bridge using the metadata file;
means for generating source code for the code bridge using the schema; and
means for deploying the code bridge using a binary component derived from the source code,
wherein the code bridge enables the client application to invoke a method on the target application, and
wherein the client application is written in a first programming language and the target application is written in a second programming language.

29. An apparatus for generating a reusable code bridge component, comprising:
means for generating a first schema defining an exposed interface for a target application;
means for generating a second schema defining an exposed interface for a first client application;
means for generating a target-side code bridge component using the first schema and the second schema;
means for generating a first client-side code bridge component using the first schema and the second schema;
means for bridging the target application and first client application using the first client-side code bridge component and the target-side code bridge component;
means for generating a third schema defining an exposed interface for a second client application;
means for generating a second client-side code bridge component using the first schema and the third schema; and
means for bridging the target application and the second client application using the second client-side code bridge component and the target-side code bridge component.

* * * * *